July 2, 1963 L. D. ATKINS ETAL 3,096,027
COMBUSTION CONTROLLED FLASHER LAMP
Filed Dec. 1, 1960 2 Sheets-Sheet 1

Lyle D. Atkins
Warren E. Holmgreen, Jr.
INVENTOR.

July 2, 1963  L. D. ATKINS ETAL  3,096,027
COMBUSTION CONTROLLED FLASHER LAMP
Filed Dec. 1, 1960  2 Sheets-Sheet 2
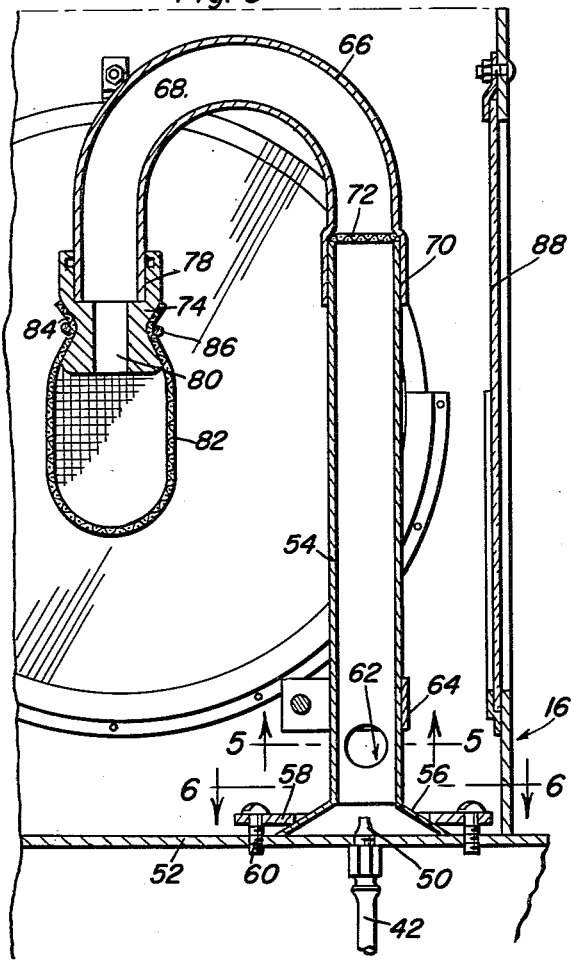
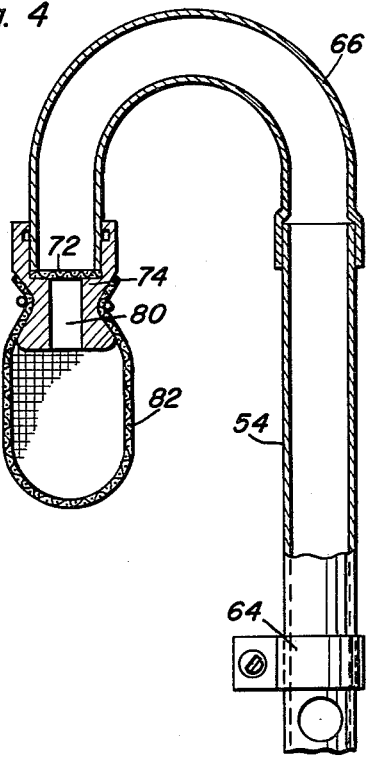
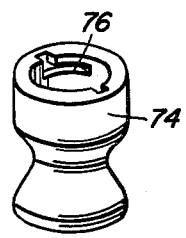
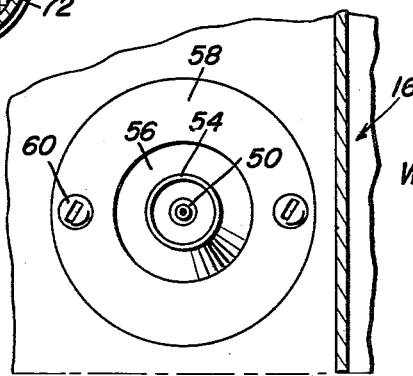
Lyle D. Atkins
Warren E. Holmgreen, Jr.
INVENTORS

United States Patent Office 3,096,027
Patented July 2, 1963

---

3,096,027
COMBUSTION CONTROLLED FLASHER LAMP
Lyle D. Atkins and Warren E. Holmgreen, Jr., San Antonio, Tex., assignors, by direct and mesne assignments, to Warning Lites Company, Inc., San Antonio, Tex., a corporation of Texas
Filed Dec. 1, 1960, Ser. No. 73,131
6 Claims. (Cl. 240—11)

The present invention relates to flasher light assemblies provided for the purpose of emitting a blinking light or signal and is particularly useful for highway purposes to warn motorists.

A primary object of this invention is to provide a controllable blinking lamp in which the intensity and the frequency of the flash flame of the lamp may be varied and yet provide a constant pilot light between the illuminating and non-illuminating phase intervals.

Another object of this invention is to provide an intermittent flashing signal lamp which will function despite any substantial angular displacement thereof from a vertical position.

A further object of this invention in accordance with the foregoing objects, is to provide a gaseous fuel burning lamp providing a steady pilot flame and featuring a combustion controlled intermittently produced flash flame, the intensity, duration and frequency of which may be controlled by controlling the discharge pressure of the gaseous fuel and the air intake opening in an air fuel mixture passage. The control apparatus of the present invention therefore avoids complicated valving structures and mechanical control mechanism endowing the novel lamp of this invention with simplicity, compactness and portability.

An additional object of this invention is to provide a combustion controlled flashing flame lamp which may be converted to a steady flame lamp with little modification rendering the apparatus more versatile.

The lamp apparatus of this invention therefore, comprises a liquid fuel containing tank in which liquid fuel of a volatile nature is disposed. Mounted above the fuel tank is a valve housing within which a tank valve is disposed seated on top of the fuel tank and receiving gaseous fuel from within the fuel tank for supply to an adjustable pressure regulator valve whereby the gaseous fuel under a predetermined pressure may be metered and supplied to a nozzle connected to an illumination housing which is mounted in spaced relation above the fuel tank. The nozzle is disposed within the lower end of a fuel mixture passage fastened to the bottom of the illumination housing about the nozzle, and extending vertically thereabove. Air inlet openings, the size of which is adjustable, are disposed in the side of the fuel mixture passage spaced above the nozzle for controlling the air fuel ratio mixture and the upward flow through the fuel mixture passage. Connected to the upper end of the fuel mixture passage is a tubular conduit of U-shaped configuration within which a combustion chamber is defined. At the other end of the tubular U-shaped conduit, a mantle holder device is removably mounted from which a flame confining mantle of screen material is suspended. The mantle holder also provides a restricted discharge passage between the end of the combustion chamber tubular conduit and the mantle. Also, disposed between the upper end of the fuel mixture passage and the combustion chamber conduit, is a screen flame arrester by means of which proportioning of combustible and non-combustible fluids is controlled. It will therefore be apparent that the air fuel mixture passing from the fuel mixture passage into the combustion chamber will enter the mantle which if heated will produce a flame therein. The flame will continue steadily as long as a combustible fuel mixture is supplied thereto at the burning rate of the flame. However, if the fuel mixture is so controlled by the amount of air admitted and the volumetric flow rate as controlled by the adjustable pressure regulator valve, the combustion within the combustion conduit producing the flame within the mantle may consume the combustible fuel mixture at a greater rate than the volumetric flow rate of the combustible fuel mixture to finally produce within the passage adjacent the mantle a non-combustible mixture. Accordingly, with the flame arrester restricting combustion to a predetermined volume in the fuel mixture passage, a flash flame will be produced within the mantle periodically rather than continuously to produce the blinking signal for the lamp.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a partial sectional view of an upper portion of the flasher lamp.

FIGURE 4 is a partial sectional view of a modification of the flasher lamp as illustrated in FIGURE 3.

FIGURE 5 is a sectional view taken substantially through a plane indicated by section line 5—5 in FIGURE 3.

FIGURE 6 is a partial sectional view taken substantially through a plane indicated by section line 6—6 in FIGURE 3.

FIGURE 7 is a perspective view of the mantle holder.

Figure 1:
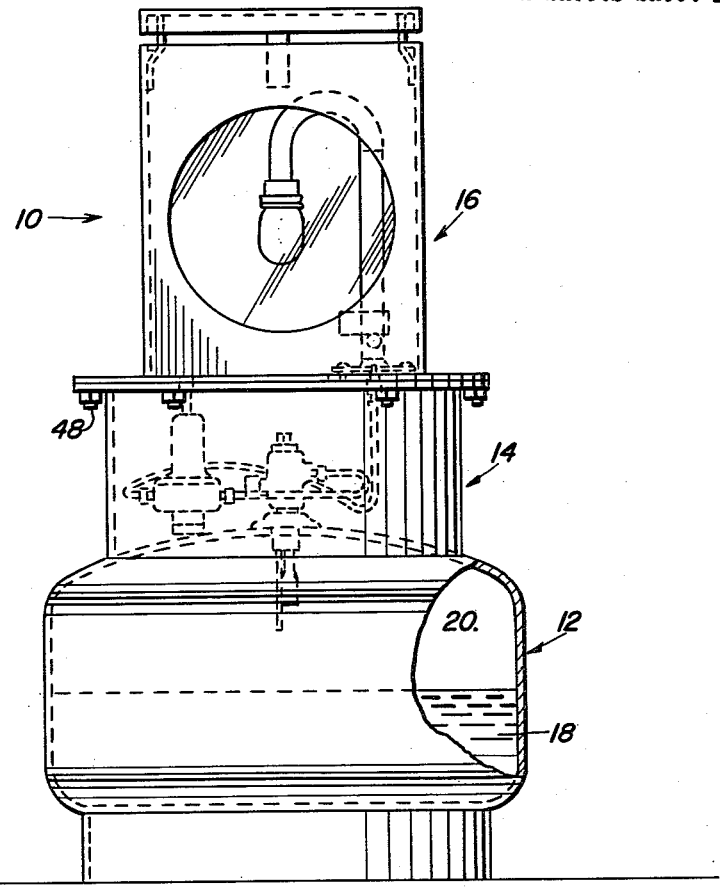
FIGURE 1 is a front elevational view of the flasher lamp with parts shown in section.

Referring now to the drawings in detail, FIGURE 1 illustrates the flasher lamp which is generally referred to by reference numeral 10. It will be observed that the lower portion of the lamp 10 includes a liquid fuel tank generally referred to by reference numeral 12. Mounted above the fuel tank 12 is a valve containing housing 14 and mounted above the housing 14 in spaced relation from the tank 12 is the illumination housing 16.

Figure 2:
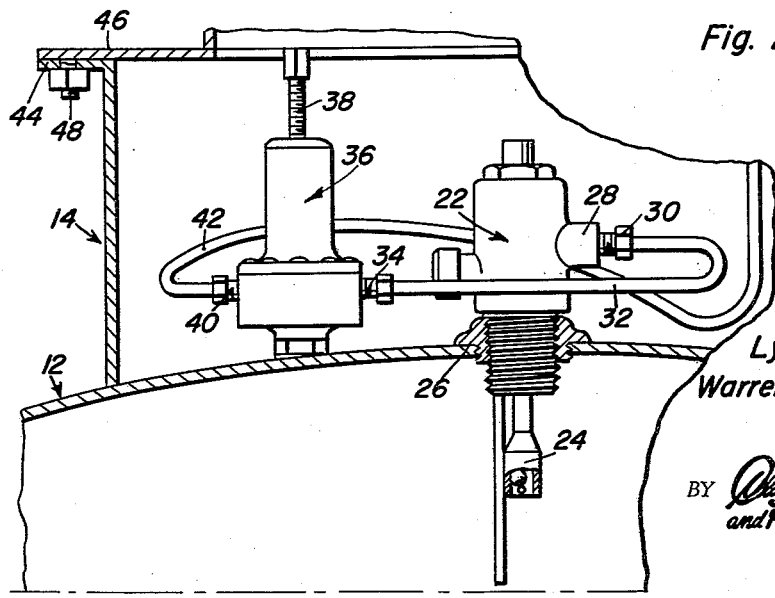
FIGURE 2 is a partial enlarged sectional view of a portion of the flasher lamp.

Disposed within the fuel tank 12 is a liquid fuel 18 which is a volatile type fuel producing a gaseous fuel atmosphere 20 within the upper portion of the fuel tank 12. Referring now to FIGURE 2 in particular, it will be observed that a tank valve 22 of conventional design is mounted on top of the fuel tank 12 and includes an inlet portion 24 disposed within the gaseous fuel atmosphere of the tank 12. The valve 22 is accordingly mounted on the top wall of the tank 12 in sealed relationship thereto by means of the sealing fitting 26. Connected to the valve outlet 28 by means of fitting 30 is a conduit 32 which conducts the gaseous fuel to the inlet fitting 34 of a pressure regulator valve 36. The regulator valve 36 is also of conventional design and is adjustable by the adjustment member 38 to variably regulate the discharge pressure of the gaseous fuel being discharged from fitting 40 into the conduit 42.

It will be observed that the valve mechanisms 22 and 36 which are disposed within the housing 14 are mounted below the illumination housing 16. The valve housing 14 accordingly includes a flange 44 upon which the bottom flange 46 of the housing 16 is seated and connected to the valve housing flange 44 by means of a plurality of fasteners 48. Accordingly, the illumination housing 16 may be removed from the valve mechanism housing 14 for the purpose of adjusting the adjustment member 38 of the pressure regulator valve mechanism 36. Also, by so removing the illumination housing 16 adjustment may be made in the air fuel ratio control as will hereafter be explained.

The conduit 42 connected to the discharge fitting 40 of the pressure regulator valve 36 is connected at its opposite end to a nozzle device 50 as more clearly seen in FIGURE 3. The nozzle is mounted within the bottom plate 52 of the housing 16 and is also positioned in axial alignment with a fuel mixture passage member 54. The tubular member 54 includes at the bottom thereof an outwardly flared portion 56 which is seated on the bottom plate 52 of the housing about the nozzle device 50 and is secured thereto by means of the plate member 58 and screw fasteners 60. It will be observed that disposed in the tubular member 54 spaced above the nozzle device 50 is an air inlet opening 62 the size of which may be controlled by the air mixture control member 64 slidably disposed about the tubular passage member 54 for restricting the opening 62. It will therefore be apparent that the gaseous fuel discharged from the nozzle device 50 will create an upward draft for drawing air through the opening 62 into the passage member 54 to provide the proper air fuel ratio mixture as desired. Furthermore, it will be apparent that by controlling the pressure discharge from the pressure regulator valve 36 and by controlling the air inlet to the passage member 54 both the volumetric flow of the fuel mixture and the richness of the fuel mixture available for combustion may be controlled for controlling the operation of the flasher lamp as will be hereafter explained.

Connected to the top of the passage member 54 is a tubular combustion conduit member 66 which is U-shaped in configuration and which defines therewithin a combustion chamber 68. The end 70 of the tubular member 66 is connected to the top of the passage member 54 and also mounts therebetween a flame arrester element 72 for restricting combustion which is of screen like material. The other end of the tubular member 66 is received within a mantle holder member 74 and is connected thereto by having a projecting pin received within the slots 76 as more clearly seen in FIGURE 7. The mantle holder member includes a recess portion 78 for receiving the end of the tubular member 66 and a discharge passage 80 providing a more restricted discharge between the combustion chamber 68 and an illumination emitting mantle device 82 constituting an intermittent combustion chamber which is made of screen-like material and is fastened to the neck portion of the holder device 74 by a clamp element 86.

From the foregoing description, it will be apparent that a continuous but adjustable supply of gaseous fuel from the nozzle device 50 passing upwardly through the fuel mixture passage 54 and mixed with the air entering the inlet 62 will pass through the combustion passage chamber 68 wherein it will chemically react at a temperature above fuel ignition value to release energy in the form of a flame issuing through the passage 80 into the flame confining mantle 82 and also produce non-combustible combustion products. To produce the continuous burning flame in the mantle 82, it will therefore be necessary to raise the temperature of the mantle device 82 so as to ignite the fuel mixture issuing from the passage 80 thereinto. It will be appreciated therefore that the ignited fuel mixture which burns within the combustion chamber 68 will produce a steady flame as long as the presence of combustible amounts of fuel and air is maintained by a flow of fuel mixture supplied to the combustion chamber to which combustion is restricted by the flame arrester 72. Accordingly, if the volumetric flow rate of the fuel mixture and the richness thereof is controlled by control of the pressure regulator valve mechanism 36 and the air inlet opening device 64, it will predetermine the fluid flow present during the illuminating and non-illuminating phases as hereinbefore indicated. When combustion occurs it reduces the combustibility of the resulting mixture at the discharge end of the flow passage at a faster rate than the supply rate of fuel so that the flame recedes from and is no longer visible through the mantle 82. Accordingly, as the combustible components of the fluid are reduced, the flame travels back from the mantle toward the more combustible portions of the fluid adjacent the frame arrester 72 which prevents it from further travelling downwardly through the passage member 54 so as to reduce the amount of combustion and the rate of depletion of the combustible portions of the fluid after the flame has receded. The reduced combustion then permits build-up of the fuel mixture within the chamber 68 until the more rapid burning or combustion occurs once again, less restricted within the mantle, causing a depletion of the combustible portions of the fluid at a faster rate than the supply thereof so as to repeat the foregoing process. Accordingly, an intermittent flash flame is produced within the mantle 82 to provide the blinking signal for the flasher lamp.

It will be noted that a plurality of lenses 88 some of which may be colored, are mounted in the sides of the housing 16 at a focal distance from the light producing mantle 82. Accordingly, the lens elements 88 will transmit maximum illumination from the housing 16.

Referring now to FIGURE 4, it will be observed that the flame arrester 72 has been removed from its installation between the upper end of the fuel mixture tube 54 and the combustion chamber tube 66 to the end of the combustion chamber tube 66 within the mantle holder 74. The flame is accordingly confined within the mantle 82 so that both the tubular members 54 and 66 constitute fuel mixture supply passage with combustion occurring within the passage 80 so as to provide a flame issuing therefrom within the mantle 82. Accordingly, it will be appreciated that by minor rearrangement of one part, the lamp may be conditioned for steady burning purposes where it is desired to provide a bright steady flame without blinking.

From the foregoing description, operation and utility of the flasher lamp device of this invention will be apparent. It will therefore be appreciated that by virtue of the novel arrangement utilizing the combustion within the chamber 66 for producing the flashing flame due to flame flash-back to the flame arrester 72, a more simple and reliable blinking light is produced. Furthermore, correspondingly simpler and less costly equipment is needed for controlling the intensity, duration and frequency of the flash by merely controlling the pressure discharged from the regulator valve 36 and varying the size of the air inlet opening 62 by adjustment of the clamp collar 64 held in adjusted position by means of the clamp fastener 90 as seen in FIGURE 5. As a result of the novel arrangement and construction, it will be further appreciated that the lamp may be displaced a substantial distance from its vertical position and yet be operative as hereinbefore indicated. In addition to the elimination of complicated and expensive mechanical control and valve control mechanisms, the lamp device of the present invention is further rendered more versatile by virtue of the relocation of the flame arrester 72 for producing a steady rather than a blinking light as hereinbefore indicated.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A combustion controlled flasher lamp comprising, a source of fluid fuel, pressure regulator means operatively connected to said source for supplying a metered flow of fuel, flow passage means operatively connected to said source for conducting said metered flow of fuel, fuel mixture control means operatively connected to said passage means for supplying an adjustable proportion of combustion supporting fluid to form a combustible mixture with said fuel in response to said metered flow thereof, discharge means operatively connected to said passage means, illumination emitting means operatively mounted by said discharge means for defining a volume within which combustion consumes said combustible mixture at a rate depleting the supply thereof, and means mounted within said flow passage means intermediate said source and said discharge means for volumetrically limiting continued combustion within said passage means receding therewithin from the illumination emitting means in response to depletion of said combustible mixture, whereby illumination is intermittently produced within the illumination emitting means without interruption in combustion of said combustible mixture.

2. The combination of claim 1, wherein said means for volumetrically limiting combustion within the passage means comprises, a flame arrester mounted within said passage means in spaced relation to said discharge means to define a passage volume to which combustion is restricted.

3. A combustion controlled flasher lamp comprising, a source of fluid fuel, pressure regulator means operatively connected to said source for supplying a metered flow of fuel, flow passage means operatively connected to said source for conducting said metered flow of fuel, fuel mixture control means operatively connected to said passage means for supplying an adjustable proportion of combustion supporting fluid to form a combustible mixture with said fuel in response to said metered flow thereof, discharge means operatively connected to said passage means, illumination emitting means operatively mounted by said discharge means, for defining a volume within which combustion consumes said combustible mixture at a rate depleting the supply thereof, and means for volumetrically limiting continued combustion within said passage means receding therewithin from the illumination emitting means in response to depletion of said combustible mixture, whereby illumination is intermittently produced within the illumination emitting means without interruption in combustion of said combustible mixture, said means for volumetrically limiting combustion within the passage means comprising, a flame arrester mounted within said passage means in spaced relation to said discharge means to define a passage volume to which combustion is restricted, said flow passage means having a curved portion, and said passage volume being formed within said curved portion of said passage means.

4. In a combustion controlled flasher lamp having passage means for conducting a flow of a combustible mixture between an inlet end and an outlet end of the passage means; discharge means connected to the outlet end of said passage means, illumination emitting means mounted on said discharge means to confine a flame therewithin, and flame arresting means mounted within said passage means in spaced relation to the discharge means intermediate the inlet end and the outlet end to volumetrically limit continuous movement of said flame between the passage means and the illumination emitting means causing intermittent depletion of said combustible mixture within the illumination emitting means.

5. In a combustion controlled flasher lamp; means for producing continuous combustion with respect to a predetermined combustion volume, means for volumetrically limiting location of said predetermined combustion volume to produce movement thereof between two limits, and means for exposing said combustion volume at only one of said two limits of movement to intermittently produce illumination therefrom, said means for producing continuous combustion comprising, adjustable fuel mixture supply means and flow passage means operatively connected to said supply means for conducting a flow of fuel mixture sufficient to sustain continuous combustion within said predetermined combustion volume, said means for exposing said combustion volume comprising, a flame confining mantle defining a volume therein exceeding said predetermined combustion volume causing a depletion of said combustible mixture therewithin and movement of the combustion volume into the passage means, said means for volumetrically limiting location of the combustion volume comprising a flame arrester mounted within said passage means intermediate said illumination exposing means and said fuel mixture supply means to define the other of said two limits.

6. In a combustion controlled flasher lamp; means for producing continuous combustion with respect to a predetermined combustion volume, means for volumetrically limiting location of said predetermined combustion volume to produce movement thereof between two limits, and means for exposing said combustion volume at only one of said two limits of movement to intermittently produce illumination therefrom, said means for volumetrically limiting location of the combustion volume including, a flame arrester mounted at the other of said two limits.

References Cited in the file of this patent
UNITED STATES PATENTS

| | | |
|---|---|---|
| 652,085 | Claybourne | June 19, 1900 |
| 1,950,696 | Sauer | Mar. 13, 1934 |
| 2,135,689 | Yeager | Nov. 8, 1938 |
| 2,263,659 | Tullis | Nov. 25, 1941 |
| 2,841,694 | Webster | July 1, 1958 |